United States Patent
Marocco

[19]

[11] Patent Number: 6,099,212
[45] Date of Patent: Aug. 8, 2000

[54] MULTI-HEAD DRILLING MACHINE FOR DRILLING SHUTTER COMPONENTS

[75] Inventor: Norbert Marocco, Woodbridge, Canada

[73] Assignee: Shade-O-Matic, Limited, Toronto, Canada

[21] Appl. No.: 09/245,459

[22] Filed: Feb. 5, 1999

[51] Int. Cl.[7] .................................................. B23B 39/24
[52] U.S. Cl. ................................ 408/3; 144/3.1; 144/92; 408/51; 408/53; 408/95; 408/103; 409/80
[58] Field of Search .................................. 408/3, 42, 43, 408/52, 53; 144/3.1, 92, 93.1, 135.2; 405/51, 95, 102, 103, 108; 409/80

[56] References Cited

U.S. PATENT DOCUMENTS

| | | | |
|---|---|---|---|
| 5,289,860 | 3/1994 | Keusch ....................................... | 408/52 |
| 5,538,372 | 7/1996 | Cuneo et al. ............................... | 408/3 |
| 6,039,514 | 3/2000 | O'Donovan et al. ....................... | 408/51 |

*Primary Examiner*—Steven C. Bishop
*Attorney, Agent, or Firm*—Ohlandt, Greeley, Ruggiero & Perle, L.L.P.

[57] ABSTRACT

A multi-head drilling machine, for use in particular in the simultaneous drilling of a plurality of side frame components for shutters, the drilling machine having a machine frame, a support carriage moveable along the frame, a transverse drilling head bar mounted transversely of the carriage, and moveable to and fro with the carriage, a first pair of drills mounted on the transverse head bar on one side of the carriage and a second pair of drills mounted on the transverse head bar on the opposite side of the carriage and being moveable in unison along either side of the carriage, clamps for clamping work pieces on either side of the carriage, in registration with respective drills, a first drill of each pair being mounted at a first predetermined position on the transverse head bar, and a second one of the drills being mounted at a second predetermined position on the transverse head bar, the first and second drills being offset with respect to one another longitudinally and laterally along the path of movement of the transverse head bar along said carriage.

13 Claims, 7 Drawing Sheets

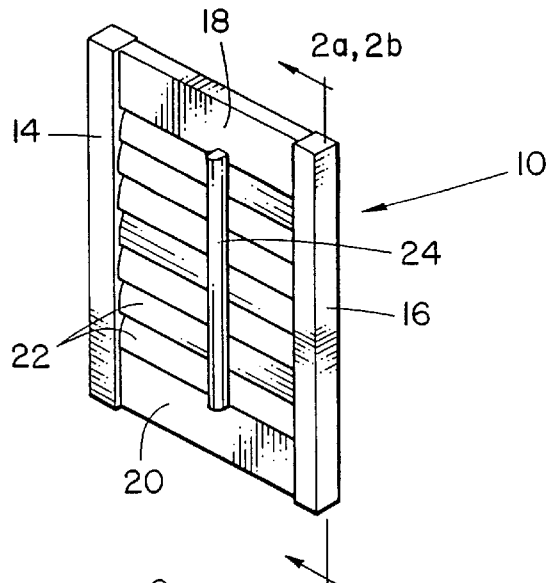
FIG. 1
Prior Art
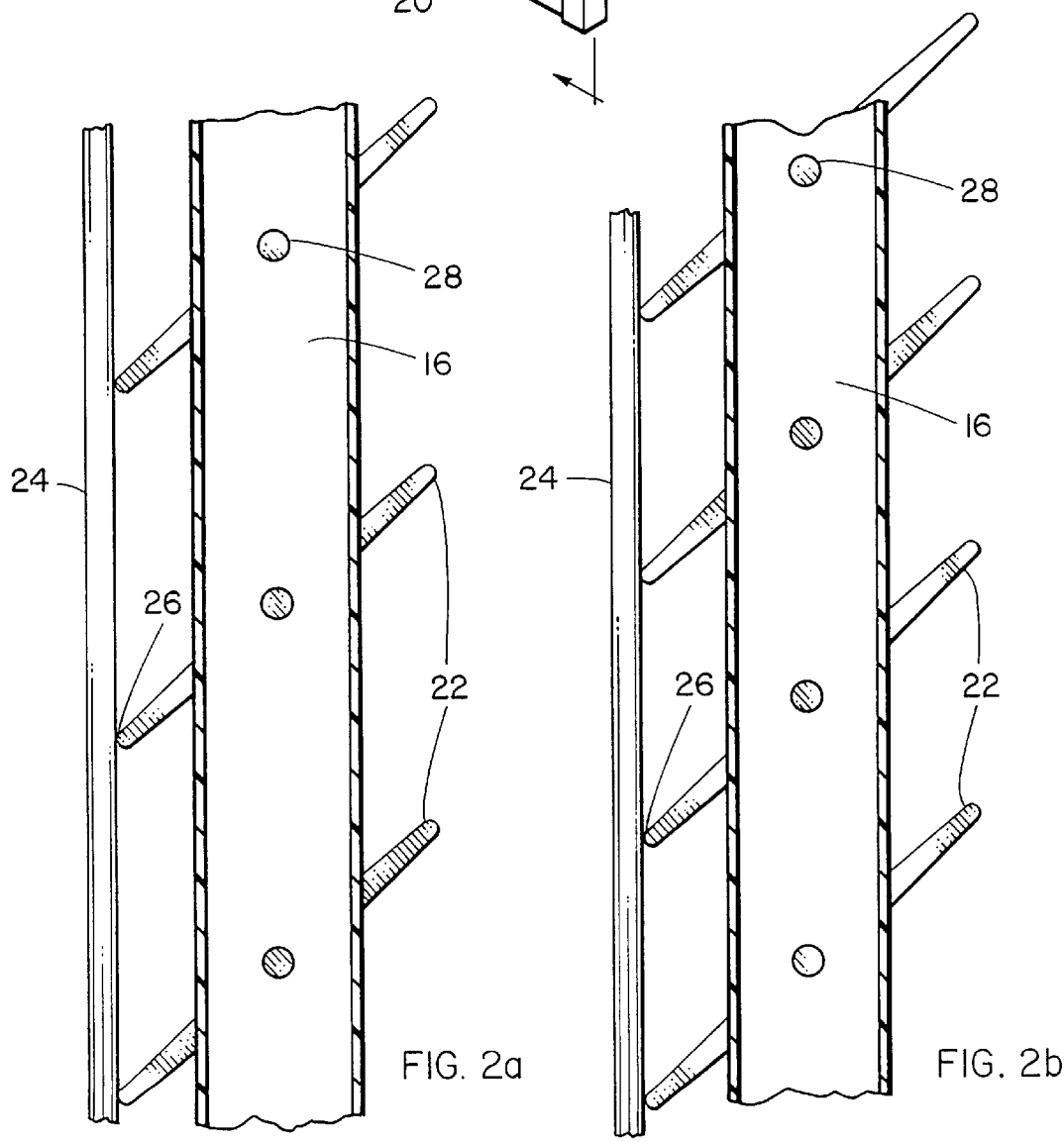
FIG. 2a
Prior Art
FIG. 2b
Prior Art

MULTI-HEAD DRILLING MACHINE FOR DRILLING SHUTTER COMPONENTS

FIELD OF THE INVENTION

The invention relates to a multi-head drilling machine for drilling holes in shutter components, particularly side frames of shutters, and pull rods of shutters.

BACKGROUND OF THE INVENTION

Louvre shutters and doors are generally manufactured with a rectangular frame fitting within the space of the window or door to be covered. A number of horizontal louvre slats or blades extend from one side frame to the other. Usually they are linked together by some means such as a pull rod, so that all of the slats can be pivoted open or closed in unison.

Other forms of pull rod pivoting mechanisms are known.

U.S. Pat. No. 5,469,658 granted Nov. 28, 1995 entitled LOUVRE SHUTTER DEVICE WITH VARIABLE SLATS, Inventor M. Digianni et al. illustrates an improved form of shutter fabricated of extruded plastic material. The shutter shown in that patent provides for opening and closing of the shutter slats by means of rack and pinion gears. The shutter slats are located spaced apart along the two side frames, and the spacing is variable, from one shutter assembly to another, depending upon the measurements of the door or window opening, to which it will be fitted.

This system overcame the problem with prior art shutters and shutter doors, in which the only adjustment for height was to simply cut off part of the bottom or top frame of the shutter.

The manufacture of the shutters shown in the aforesaid U.S. patent, with slats located on different centres from one shutter to another, required the drilling of holes in the two side frames, with the holes being drilled precisely at the desired centres for the slat spacing of that particular shutter. If that type of shutter were to be used with a pull rod, then the pull rod would also have to be drilled with holes at the precise spacing of the slats, so that the slats could be connected to the pull rod.

Drilling these holes at precisely predetermined centres for both side frames and for the pull rod, and varying the spacing of the centres from one shutter assembly to another, required the use of highly skilled labour. Eventually a machine was developed for carrying out this system. However, the machine was capable only of drilling two side frames, and one pull rod, at a time. As a result, the productivity of the machine was relatively low, leading to unnecessarily high costs in the production of such shutters.

It will of course be appreciated that sales persons will be receiving orders for window shutters or door shutters having different height dimensions, requiring the spacing of the slat holes and pull rod holes to be varied, and in the old machine it was necessary to reset the machine for each order to ensure that the holes were drilled on the correct centres.

Larger holes are required for carrying the rotational hubs of the slats themselves and smaller holes are required in the pull rod for carrying the pieces connecting the pull rod to the slats. As a result, the drilling loads on the machine had to be able to accommodate both the larger holes and the smaller holes.

In order to do this, the older machine had a central longitudinal carriage with a cross bar mounted on the carriage. Two drills were mounted on the cross bar on one side of the carriage and one drill was mounted on the cross bar on the other side of the carriage. Movement mechanism was provided for moving the cross bar along the central carriage.

Clamps were provided for clamping the work pieces, ie. the side frames and the pull bar, in position underneath the appropriate drills for drilling.

Clearly, it was desirable to improve the output of such a machine and at the same time provide for computer controlling of the drilling operations and the clamping operations, and the location of the various work pieces relative to the drill heads, so as to produce components for two shutters simultaneously, thereby doubling the production of the machine, and improving its control of variable spacing.

It is further desirable to provide a means for controlling the depth of the drill holes, so that in some cases drill holes can be drilled in one side only of each component and in other cases drill holes can be drilled through both sides of some components, depending upon the design and construction of the particular shutter being constructed.

While the invention is described in association with the drilling of components for shutters, it will be appreciated that the invention is of much broader application, and is not confined exclusively to the drilling of shutter components.

BRIEF SUMMARY OF THE INVENTION

With a view to achieving the foregoing general objectives, the invention comprises a multi-head drilling machine, for use in particular in the drilling of components for shutters although not exclusively confined thereto, which components comprise at least two pairs of side members of two shutter frames, said drilling machine comprising a machine frame, a support carriage extending along said frame, a transverse drilling head bar mounted transversely of said carriage, and moveable to and fro along said carriage, a first pair of component drills mounted on said transverse support bar on one side of said carriage and a second pair of said drills mounted on said transverse support bar on the opposite side of said carriage, whereby at least four drills are supported on said support bar, and are moveable in unison along opposite sides of said carriage, clamping means for clamping multiple side frame work pieces on either side of said carriage, in registration with respective pairs of said drills, a first drill of each said pair of drills being mounted at a first predetermined position on said transverse bar, and a second one of each pair of said drills being mounted at second predetermined position on said transverse bar, whereby said first and second drills are offset with respect to one another longitudinally along the path of movement of said transverse bar along said carriage, spacers offsetting one of said work pieces of each said pair of work pieces relative to the other of each said pair of work pieces longitudinally, said spacers offsetting said one work piece by a distance equal to the offset distance between said second drills relative to said first drills, and, computer control means for controlling movement of said transverse bar along said support carriage and for controlling operation of said first and second drills, for drilling holes in said at least four work pieces.

The invention further contemplates the provision of such a machine for two third work pieces, and two further drills, being mounted on respective opposite portions of said transverse bar, and operable to drill holes in said third work pieces, and means for clamping respective said third work pieces on respective sides of said carriage.

The invention further contemplates the provision of a control bar located longitudinally on said machine frame, above said carriage, and carrying controls connected to said transverse support bar, for guiding and operating said drills as said transverse support bar moves along said carriage, and moveable control holder means on said control bar connected with said transverse bar for permitting such movement.

The invention also contemplates provision of a unified power operated movement device connected to said transverse bar, for driving said transverse bar downwardly and upwardly, whereby to procure drilling by all said drills on said transverse bar simultaneously to a predetermined depth.

The invention also provides for holder means operable at the same time as said drills, said holder means being adapted to move into holding contact with said pairs of first and second work pieces, when said drills are drilling, and hold the same down, to prevent said first and second work pieces from being lifted upwardly by operation of said drills.

The invention further comprises a carriage means consisting of a pair of slide rails, and a carriage block carried on said slide rails, and a power operated means connected to said carriage block, and operable to move said carriage block along said rails.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 1 is a schematic perspective of a typical shutter with slats to which the invention is primarily although not exclusively related;

FIG. 2a is a section along line 2—2 of FIG. 1;

FIG. 2b is a section along line 2—2 of FIG. 1 illustrating slats on centres which are closer than FIG. 2a;

DESCRIPTION OF A SPECIFIC EMBODIMENT

Figure 3:
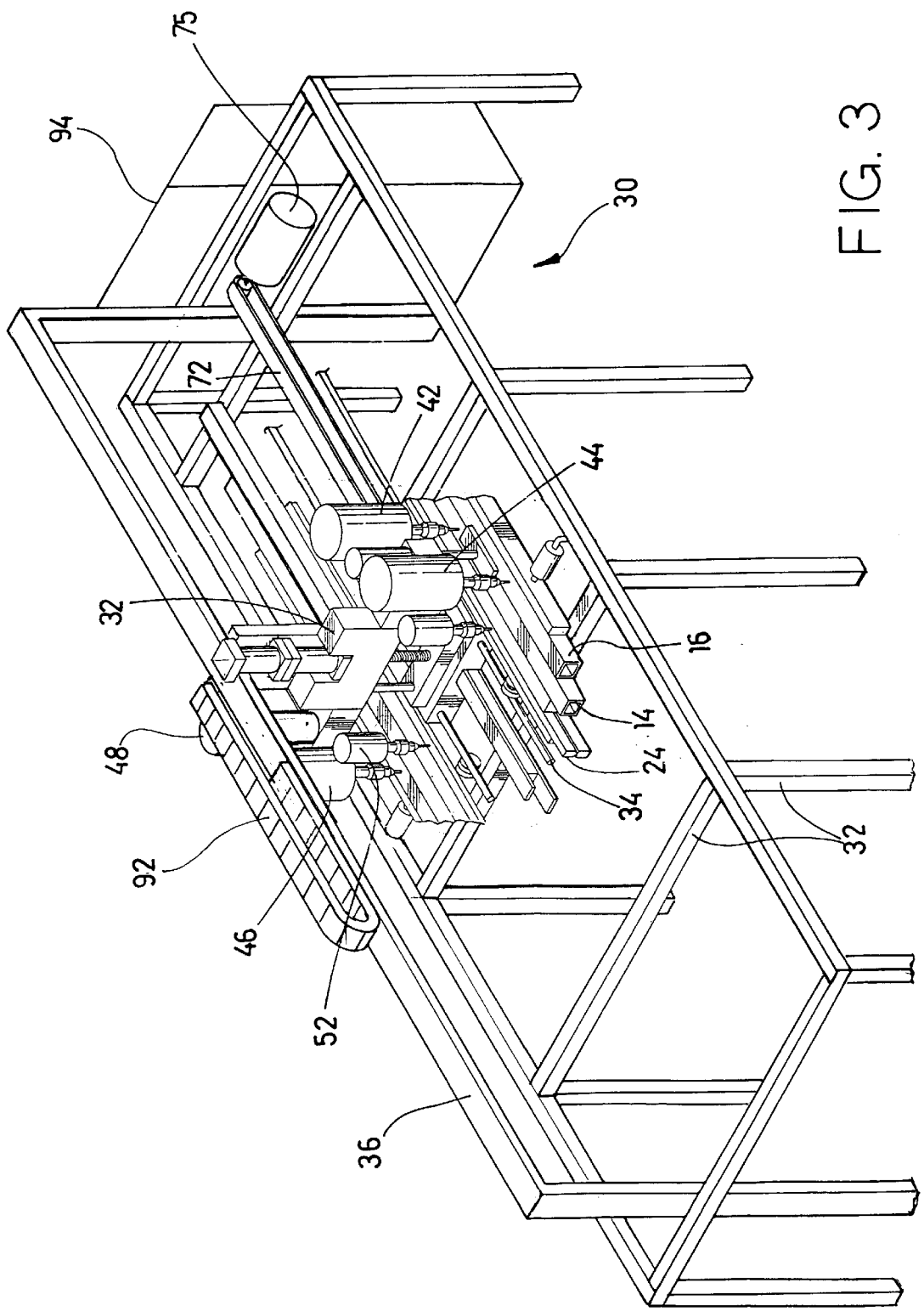
FIG. 3 is a perspective illustration of a multi-head drilling machine, illustrating one form of the invention.
Figure 4:
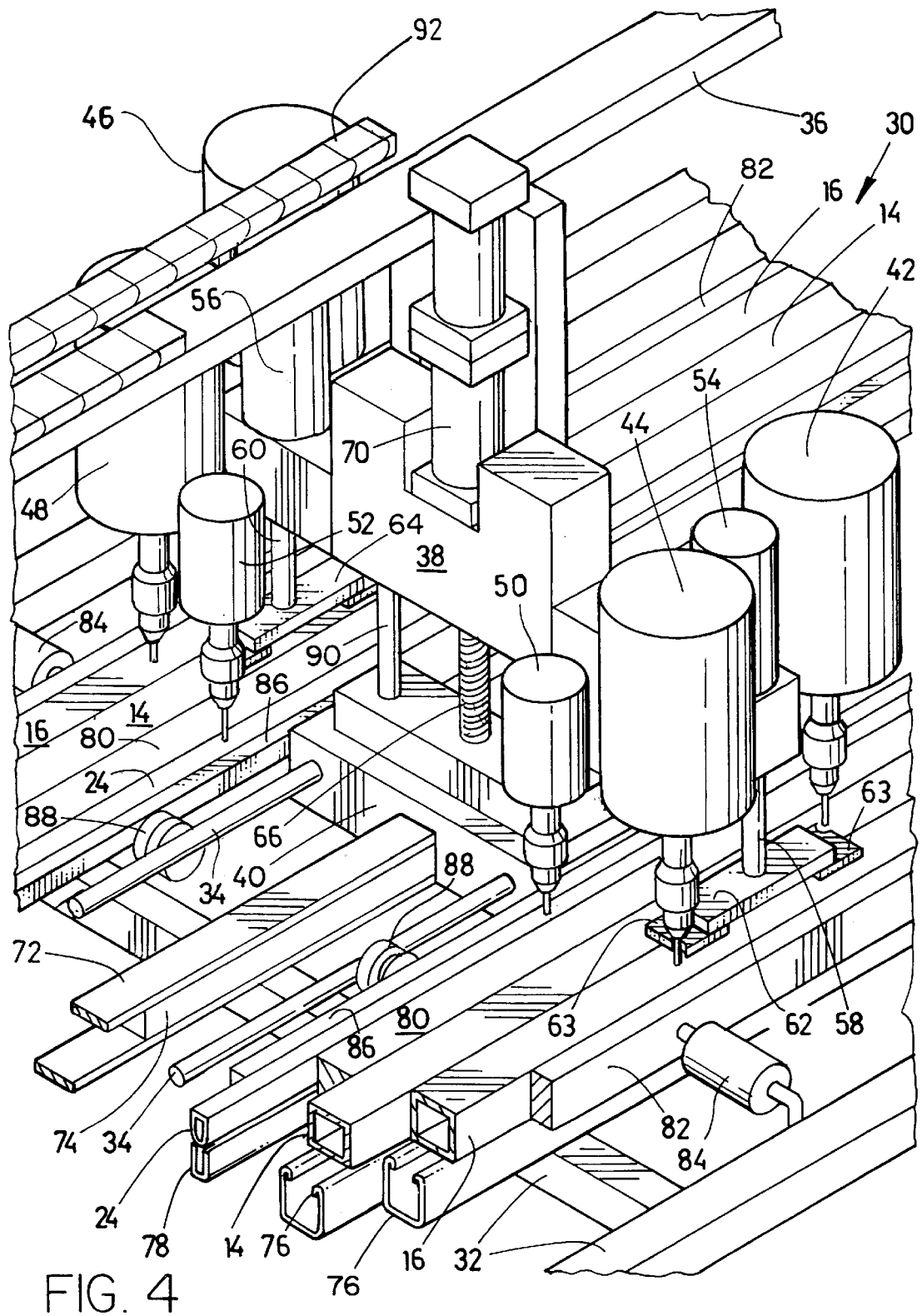
FIG. 4 is an enlarged perspective of the machine of FIG. 3.
Figure 5:
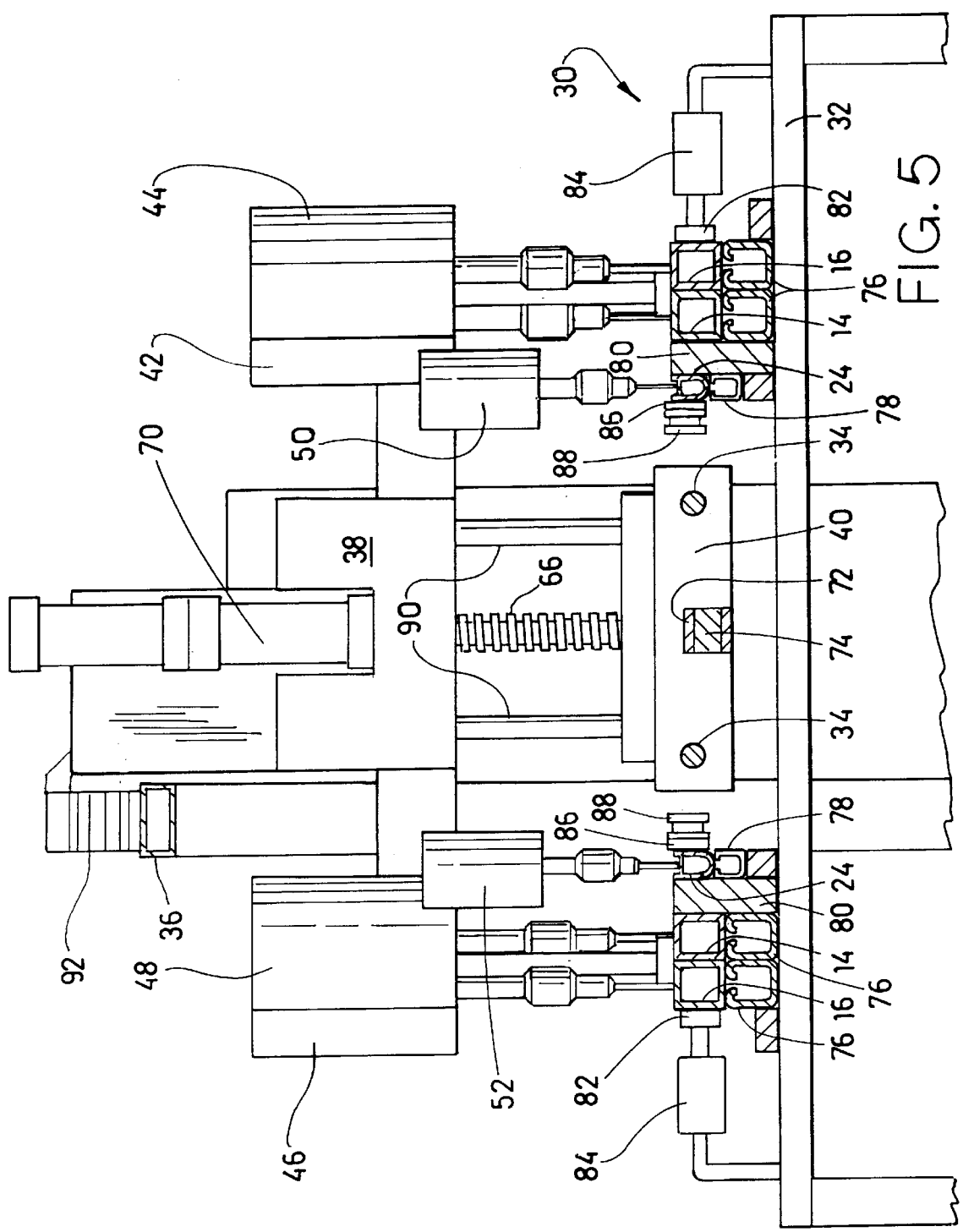
FIG. 5 is an end elevation of a portion of the machine of FIGS. 3 and 4, partially sectioned.
Figure 6:
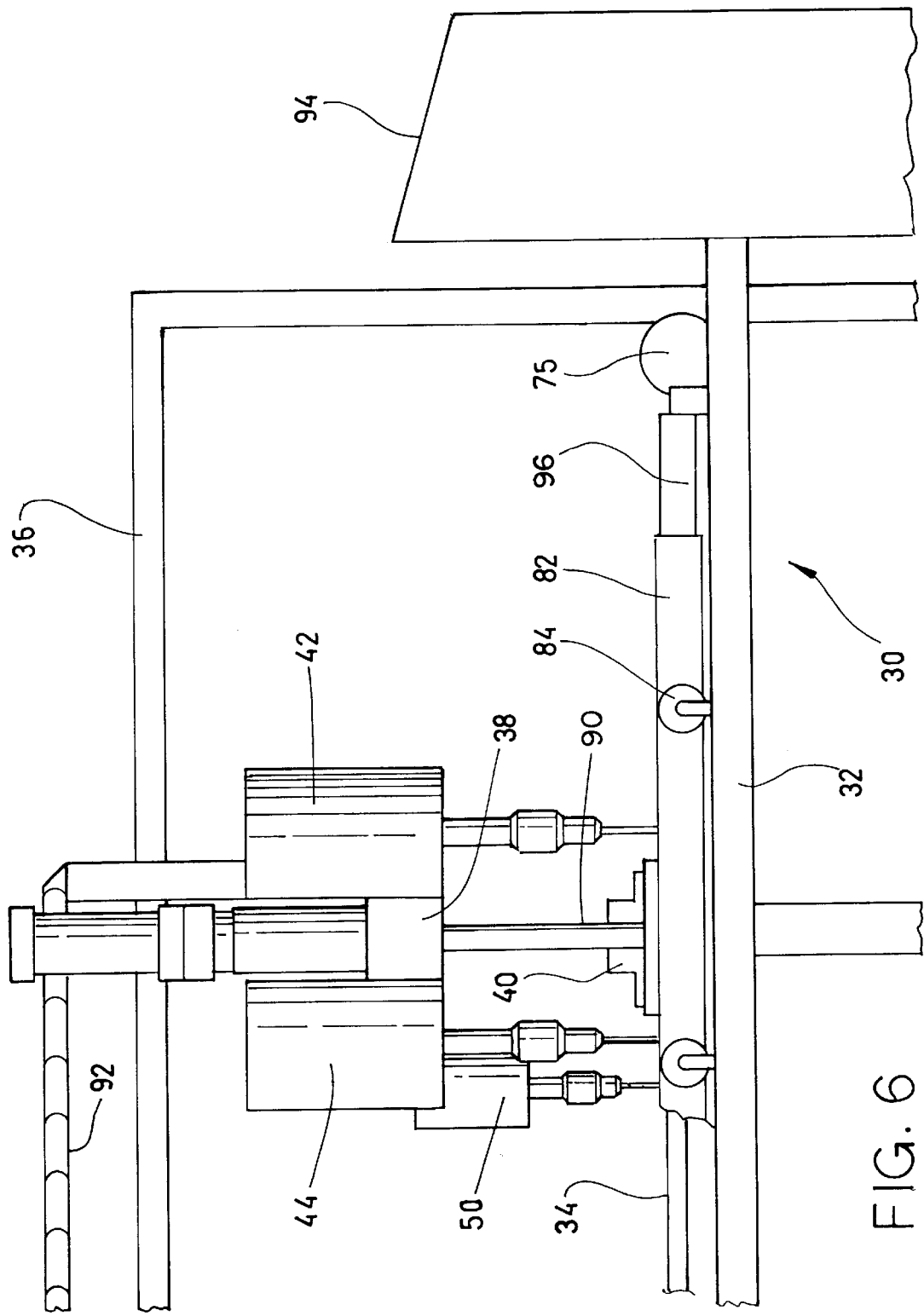
FIG. 6 is a side elevation of a portion of the machine of FIG. 5.

Before describing the invention itself, it is appropriate to give a brief description of the type of shutters and side frames and slats.

These are shown in FIGS. 1 and 2a and 2b. In FIG. 1 a typical shutter is shown schematically as 10. It has two side frames 14 and 16, and top and bottom frames 18 and 20. As is well-known such shutters have slats or louvres 22, which may be rotated closed or open. Such rotation is usually achieved by means of a pull bar 24, connected to all of the shutters by any suitable connectors 26. However, other forms of slat controls are known, in particular rack and pinion controls are shown in the aforesaid U.S. Pat. No. 5,469,658, and other controls are also known.

Such shutters 10 are required to suit and fit the particular requirements of the house on which they will be erected. Thus the actual window frames, or door openings or the like to which such shutters 10 may be fitted, may vary in height requiring adjustment of the height of the shutters. In the past, such variations in height of the shutter have usually been accommodated by simply cutting off portions of the lower frame 20, so as to match the height of the door or window opening. This however sometimes produces an unbalanced appearance in the shutter, and in most cases the lower frame 20 was of such a construction that it would only accommodate a certain limited degree of shortening, without affecting the performance of the shutter itself.

Accordingly, as described in the aforesaid U.S. patent, provision was made for mounting the shutter slats 22 on centres which were measured according to the height spacing of the window or door opening. In this way, the shutter could be designed to fit the door or window opening, and would not require cutting of the lower frame 20. In order to do this, the side frames 14 and 16, which were hollow plastic extrusions, were drilled out with axle openings, at spacings which were determined by the measurements of the door or window opening. FIGS. 2a and 2b illustrate schematically two such shutter frames showing the shutter axles being located on different centres, as between FIG. 2a where the centres are further apart, and FIG. 2b where the centres are closer together.

The purpose of describing shutters of this type, having slats located on centres which are different as between one shutter and another, is generally for the purpose of providing a full understanding of the advantages of the invention, which enables the rapid accurate production of shutter frames and components, and the simplicity of changing from drilling on a first set of centres, to drilling on a second set of centres, to produce shutters specifically in accordance with customers requirements.

In FIGS. 2a and 2b, it will be understood that the side frame members 14–16 are illustrated in this case as hollow plastic construction, and that the axles 28 of the slats 22 are merely representative of one form of construction, it being understood that a variety of different forms of construction may be used, since the invention itself is not depended specifically on the form of shutter, but is of a much wider application.

Referring to FIG. 3, the multi-head drilling machine which is shown here by way of illustrating the invention is indicated by the general reference arrow 30, comprises generally a machine bed frame 32, lengthwise slide rods 34 and an upper control support bar 36 above the rods 34. A transverse drill mounting cross-bar 38 is mounted on carriage 40. Carriage 40 is moveable along slide rods 34, to carry the carriage 40 and bar 38 longitudinally along the length of the machine bed 32.

As explained above, this multi-head drilling machine of this embodiment is designed to drill out the two pairs of side frames of two shutters simultaneously. In order to do this there are provided four main drills namely a first pair of drills 42, 44 and a second pair of drills 46, 48. The first pair of drills 42, 44 are mounted on respective forward and rearward sides of the bar 38, one being offset longitudinally relative to the other on one side of rods 34. The second pair of drills 46 and 48 are mounted on respective forward and rear sides of bar 38, offsetting them longitudinally on the opposite side of rails 34. It will be noted that drills 42 and 44 are spaced, relative to one another, so that drill 42 is closer to rails 34 and drill 44 is further away.

Similarly, drills 46 and 48 are spaced so that drill 48 is closer to rails 34 and drill 46 is further away.

In addition to the main drill pairs 42–44 and 46–48 there are two lesser drills 50 and 52 on bar 38. Drills 50 and 52 are mounted inboard relative to drills 44 and 46. The two drills 50 and 52 are of lesser capacity than the drills 42 to 48, for the reason that they are required to drill holes of a smaller diameter, in material which is somewhat thinner, than the holes drilled by drills 42 to 48.

In addition to the various drills mounted on cross bar 38, there are two hold down cylinders 54 and 56, which are mounted more or less between drills 42, 44, 46 and 48 respectively.

The cylinders 54 and 56 have cylinder rods 58 and 60, which are connected to hold down pads 62 and 64 respectively. Hold down pads 62 and 64 are generally elongated rectangular shape. They are oriented and located so as to engage both work pieces 14 and 16, and to extend a substantial distance between the two drills 42, 44, 46 and 48 respectively. In this way the hold down pads 62–64 will hold the work pieces 14 and 16 securely down while the two drills operate to drill out openings. Drill clearing blocks 63 are secured beneath pads 62–64. Blocks 63 function to extend pads 62–64, and assist in clearing drilling debris from the drills.

The entire cross bar 38 is moveable upwardly and downwardly by means of a jack screw 66, operated by means of a motor 70.

Carriage block 40, which is slidably mounted on slide rods 34–34, is moved along the bed 32 by means of a drive belt 72. Drive belt 72 runs around a belt support bar 74, and is driven by a drive motor 75 (FIG. 3).

Motor 75 and drive belt 72 can thus move the carriage 40, and the cross bar 38 supported thereon, along the length of bed 32, in either direction.

In order to support the work pieces 14 and 16, support channels 76—76 are provided on opposite sides of carriage 40, and support channels 78—78 are supported underneath the work pieces 24.

The channels 76 and 78 are open upwardly, so as to provide a clearance space for the drill if it should penetrate through both sides of the work piece, in some cases.

In order to clamp the work pieces 14 and 16 in position, a rigid bracing bar 80 is provided, which is fixed in position, on either side of rail 34—34, and a moveable clamping bar 82 is provided, which is moveably operated by means of a plurality of clamping cylinders 84—84. Cylinders 84 are mounted spaced apart along bed 32 for the purpose.

The work pieces 24 are held securely on the opposite sides of bracing bar 80, by means of a moveable clamping bars 86, which are operated by clamp members 88.

In order to stabilize cross bar 38, a pair of spaced apart parallel vertical slide bars 90—90 are provided on either side of jack screws 66.

In order to make electrical connection with the various drills and members supported on the cross bar 38, a flexible electrical support channel 92 of known design, is connected on bar 36, and is adapted to extend downwardly to cross bar 38, from where various electrical connections will be made to appropriate members. The wiring in channel 92 is connected to a computer control console 94.

Figure 7:
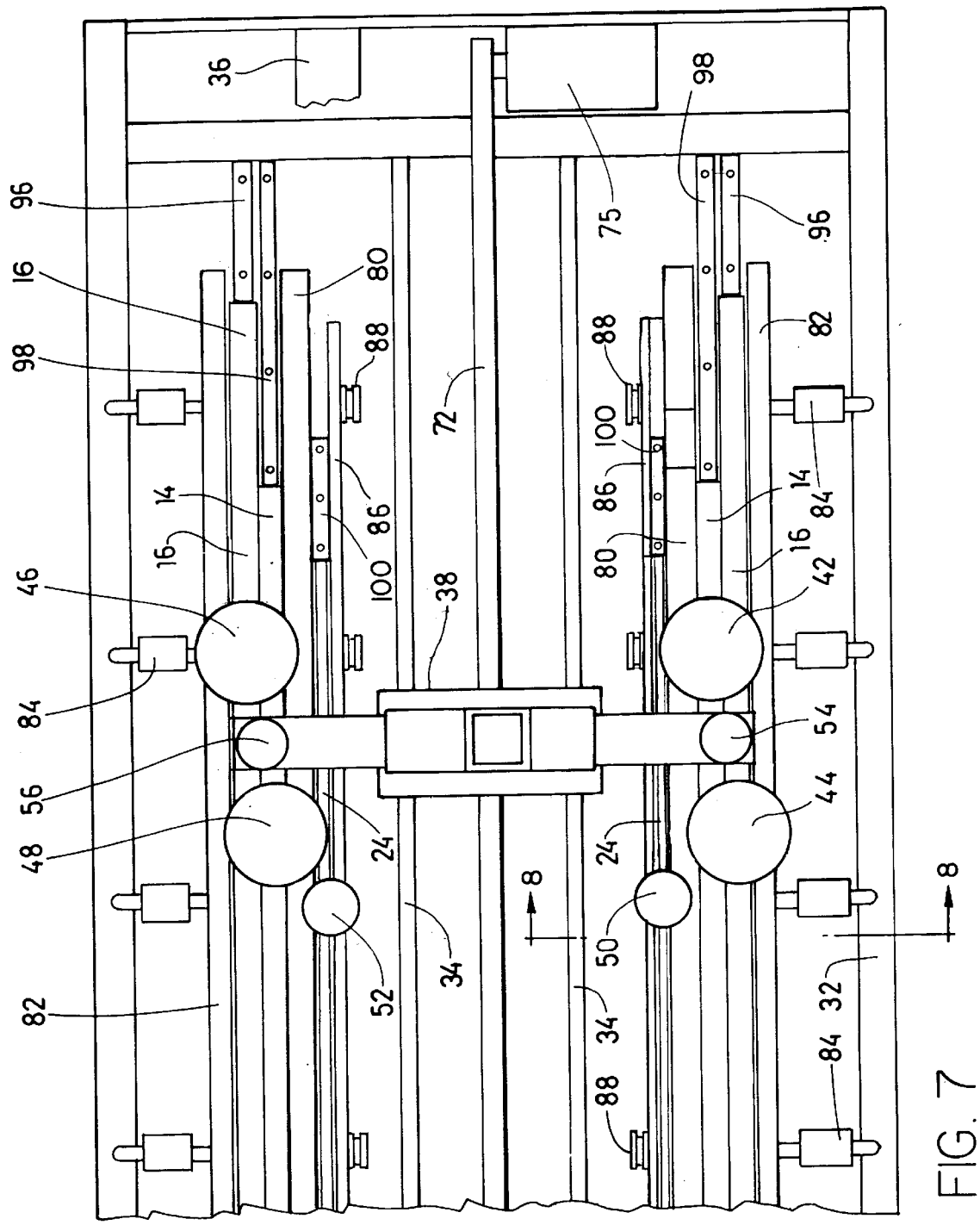
FIG. 7 is a top plan view of the machine of FIGS. 3 and 4.
Figure 8:
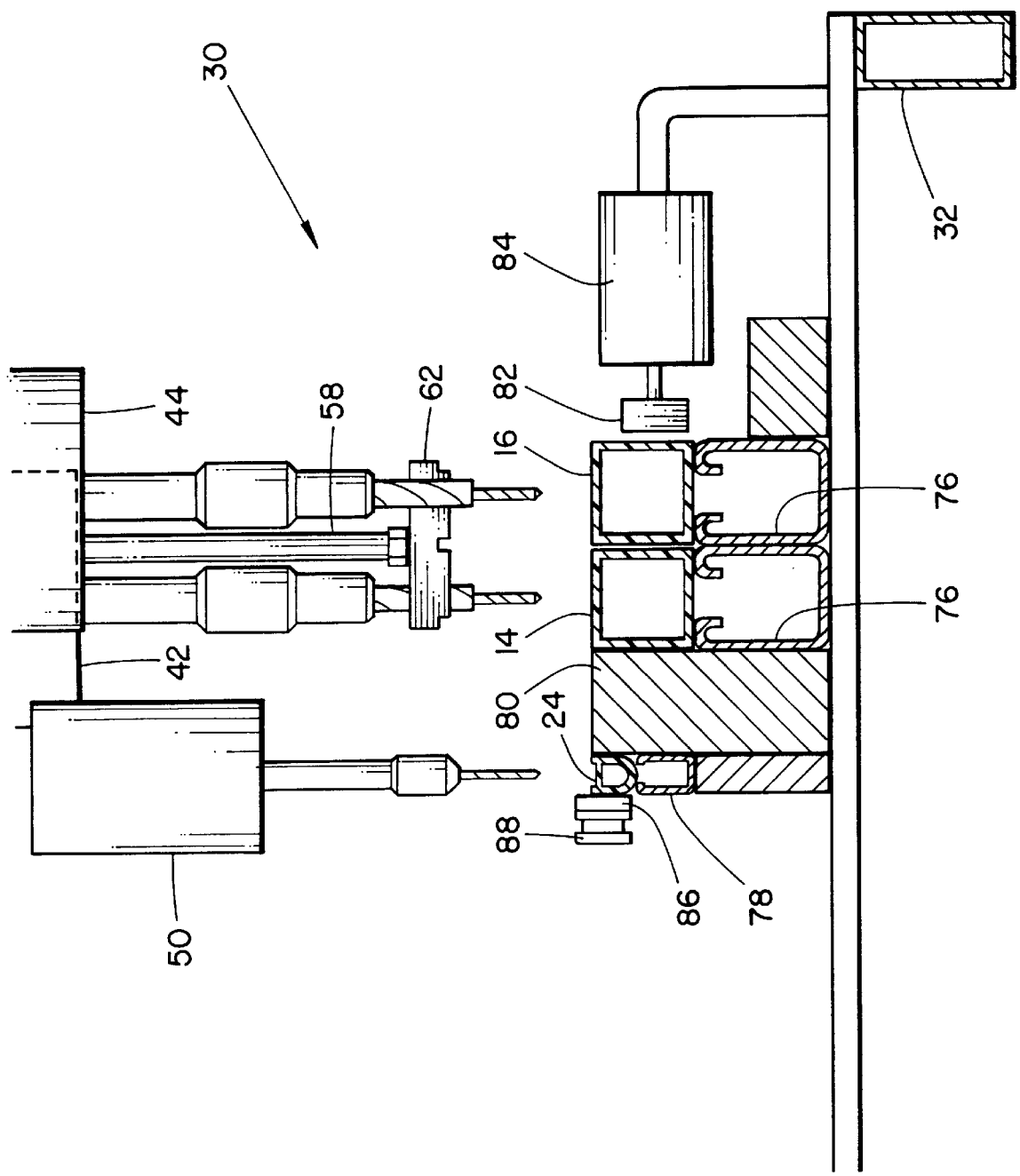
FIG. 8 is a section along line 8—8 of FIG. 7.

It will now be appreciated that since the drills 42, 44, 46 and 48 are offset longitudinally forwardly and rearwardly with respect to the transverse axis of bar 38, that spacer members are provided for locating the work pieces 14 and 16 in the correct longitudinal position. Such spacers or locating members are best seen in FIG. 7 and comprise outer and inner end stops 96 and 98 respectively. The end stops 96 and 98 define spaced apart end stops for the locating of work pieces 14 and 16 respectively, at different spaced apart locations. In this way, when the entire drilling operation commences, the holes drilled out by the drills 42, 44, 46 and 48, will be in the correct spacings for the work pieces 14 and 16. Spacers or end stops 100, are provided on either side for the spacing of pull bar work pieces 24.

It will be seen that by the operation of the invention it is possible to program the drilling of the stiles (side frames) and the pull bars of a shutter at predetermined spacings so as to fit a particular window or door or other opening. In this way shutters can be produced which have varying spacing of the holes from one shutter to another, as shown in FIGS. 2*a* and 2*b*, by simply reprogramming the machine controls.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A multi-head drilling machine, for use in particular in the drilling of components for shutters, which components comprise at least two pairs of side members of two shutter frames said drilling machine comprising;

a machine frame;

a support carriage moveable along said frame;

a transverse drilling head bar mounted transversely of said carriage, and moveable to and fro along said frame with said carriage;

a first pair of component drills mounted on said transverse head bar on one side of said carriage;

a second pair of component drills mounted on said transverse head bar on the side of said carriage opposite to said first pair, whereby at least four drills are supported on said transverse head bar, and are moveable in unison along either side of said carriage;

clamping means for clamping multiple side frame work pieces on either side of said carriage in registration with respective pairs of said drills;

a first drill of each said pair of drills being mounted at a first predetermined position on said transverse head bar, and a second drill of each pair of said drills being mounted at second predetermined position on said transverse head bar whereby said first and second drills of each pair are offset longitudinally with respect to one another longitudinally along the path of movement of said transverse head bar along said carriage;

spacers offsetting one of said work pieces of each said pair of work pieces relative to the other of each said pair of work pieces longitudinally, said spacers offsetting said one work piece by a distance equal to the offset distance between said second drills relative to said first drills; and, computer control means for controlling movement of said transverse head bar along said carriage and for controlling operation of said first and second drills, for drilling holes in said at least four work pieces.

2. A multi-head drilling machine as claimed in claim 1 for accommodating two third work pieces, and including two third drills, being mounted on respective opposite portions of said transverse head bar, and operable to drill holes in said third work pieces, and means for clamping said third work pieces.

3. A multi-head drilling machine as claimed in claim 1 including a control support bar located longitudinally on said machine frame, above said carriage, and connected to said transverse head bar, for controlling operation of said drills as said transverse head bar moves along said carriage, and moveable control holder means on said control support bar connected with said transverse head bar.

4. A multi-head drilling machine as claimed in claim 1 including a unified power operated movement device connected to said transverse head bar, for driving said transverse head bar downwardly and upwardly, whereby to procure drilling by all said drills on said transverse bar simultaneously to predetermined depths.

5. A multi-head drilling machine as claimed in claim 1, and including hold down cylinder means, mounted on said transverse head bar on opposite sides of said carriage, and hold down bars operable by said hold down means, said hold down bars being engageable with said work pieces, to hold the same down during drilling.

6. A multi-head drilling machine as claimed in claim 5 wherein said hold down means comprise hold down cylinders located on said transverse head bar between respective first and second drills on each side of said bar, whereby said hold down bars move downwardly into contact with said work pieces, between said first and second drills.

7. A multi-head drilling machine as claimed in claim 1 wherein said support carriage includes a pair of parallel slide rods extending from one end to the other of said machine frame, and a support carriage body slidably mounted on said slide bars, for moving to and fro along the length of said machine frame.

8. A multi-head drilling machine as claimed in claim 7 and wherein said transverse head bar includes a pair of substantially vertical slide bars, connecting with said support carriage, and stabilizing said transverse head bar for upward and downward movement relative to said support carriage.

9. A multi-head drilling machine as claimed in claim 8 including jack screw means connecting between said transverse head bar and said support carriage, and motor means for rotating said jack screw, whereby to cause downward and upward movement of said transverse head bar relative to said support carriage.

10. A multi-head drilling machine as claimed in claim 1 and wherein said clamping means for clamping said side frame work pieces comprises a continuous locating bar on either side of said carriage, for locating both said work pieces side by side, a fixed spacer bar mounted between said work pieces and said support carriage, and a moveable clamping bar mounted remote from said support carriage, and clamping cylinder means operable to move said clamping bar into clamping arrangement with said work pieces, whereby to clamp same against said locating bar.

11. A multi-head drilling machine as claimed in claim 10 wherein said drilling machine accommodates two third work pieces, and including support bars for supporting and locating said two third work pieces, and further clamping bars operable to clamp said two third work pieces against said locating bars.

12. A multi-head drilling machine as claimed in claim 1 and further including upwardly open support channels located along the axis of each of said work pieces, said upwardly open channels supporting said work pieces during drilling.

13. A multi- head drilling machine as claimed in claim 1 and including drill clearing block means moveably mounted adjacent to respective said drills and being located so as to release drill debris from said drills when they are moved upwardly by said transverse head bar.

* * * * *